United States Patent [19]

Canziani

[11] Patent Number: 4,801,000
[45] Date of Patent: Jan. 31, 1989

[54] METHOD FOR THE CONTROLLED ACTUATION OF DEVICES FOR UNLOADING THE CONVEYED ITEMS, IN SORTING APPARATUS

[76] Inventor: Francesco Canziani, Via Contardo Ferrini, 21, 21010 San Macario-Varese, Italy

[21] Appl. No.: 96,602

[22] Filed: Sep. 11, 1987

[30] Foreign Application Priority Data

Sep. 24, 1986 [IT] Italy ................. 21799 A/86

[51] Int. Cl.$^4$ ............................................. G65G 47/46
[52] U.S. Cl. ......................... 198/365; 198/477.1; 198/802; 74/572
[58] Field of Search ............ 198/365, 371, 372, 476.1, 198/477.1, 802, 832, 834, 835, 855, 859, 577, 856; 74/572

[56] References Cited

U.S. PATENT DOCUMENTS

| | | | |
|---|---|---|---|
| 3,231,068 | 1/1966 | Harrison et al. | 198/365 |
| 3,701,414 | 10/1972 | Mayer et al. | 198/856 |
| 3,912,071 | 10/1975 | Nielsen | 198/365 |
| 4,429,781 | 2/1984 | Holzhauser | 198/577 |
| 4,499,965 | 2/1985 | Oetting et al. | 74/572 |
| 4,712,965 | 12/1987 | Canziani | 198/365 |

FOREIGN PATENT DOCUMENTS

25859A8  1/0181  Italy .
22482A8  2/1982  Italy .

Primary Examiner—Joseph E. Valenza
Attorney, Agent, or Firm—Ladas & Parry

[57] ABSTRACT

In a sorting apparatus wherein the items to be sorted are laid on planes consisting of revolving belts that effect the unloading in predetermined points of the path, the motor that controls the rotation of said belts is linked to the same by means of a drive comprising a flywheel and a joint, the latter being controlled in turn by means that may sense the speed of rotation of the belt. The motor is actuated a few seconds before the unloading takes place, so as to store up sufficient energy in the flywheel; in correspondence of the collecting area, the joint is actuated to make the belt rotate and to unload the item.

2 Claims, 2 Drawing Sheets

METHOD FOR THE CONTROLLED ACTUATION OF DEVICES FOR UNLOADING THE CONVEYED ITEMS, IN SORTING APPARATUS

The present invention provides a method for the controlled actuation of devices for unloading items conveyed in sorting apparatus of the revolving belt type.

Figure 1:
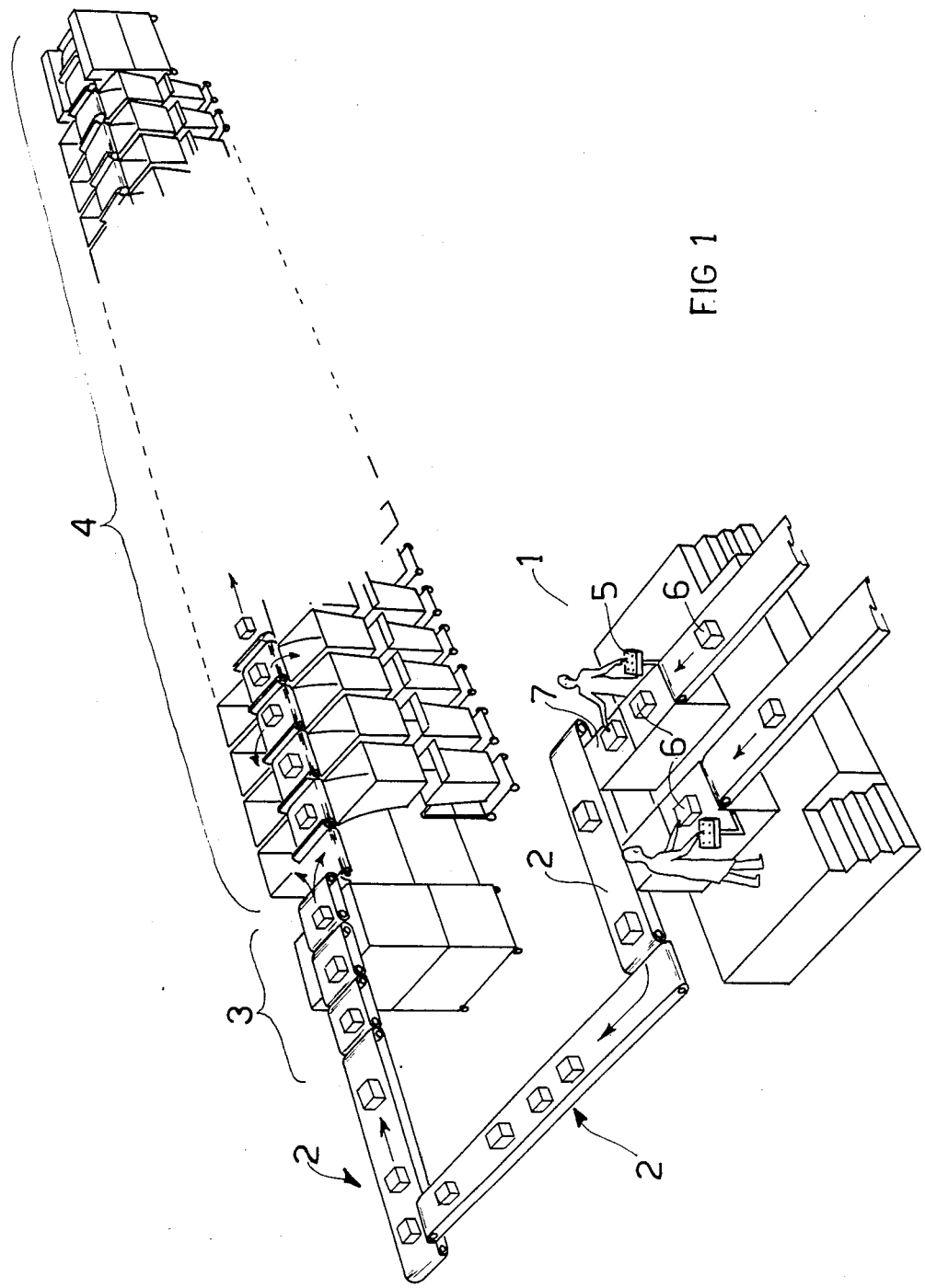

Apparatus of this kind—one of which is showed by way of example in FIG. 1—are described in the Italian patent application Nos. 25895 A/81 and 22482 A/82 by the same inventor. Said apparatus comprise generally a plurality of carriages, each one of them carrying a revolving belt where the items is laid; said belt is driven in eithee direction, orthogonally to the direction of feed of the carriage, by a motor mounted too on the carriage.

At either side of the path there are collecting devices consisting of containers or hoppers located the one next to the other.

The belt drive motors are fed, by means of sliding contacts, by a plurality of discontinue bus bars, placed one after the other near the carriage track.

The length of each bar is roughly the same as the sizes of the collecting devices, so that it is possible to actuate the motor of each belt just when the carriage passes before the area expressly provided for the unloading of the conveyed item.

The bus bars are connected to a feeder controlled by a central computer that controls all the apparatus functions and operates consequently the unloading at the proper moment.

Plants of this kind often comprise hundreds of carriages, and this implies that many belts are actuated at the same time.

This plant system allowed to solve several problems, caused by the fact that the carriages move at speeds of many mt/sec., the sizes of the unloading mouths are relatively small, and the available time within which to effect the unloading is very reduced (e.g. 200 m/sec.); in such limited time the unloading belts should reach high speeds too (e.g. 4 m/sec.). In order to achieve these results, the overfeeding is usually employed, that is the motor is fed with rather high currents for the short time available for unloading.

From a plant engineering point of view, the handling, even though for short instants, of high powers makes the technology relative to the power supply and distribution systems more complicated, and involves the oversizing of the contacts (sliding contacts and bus bars).

It is thus necessary to limit both the apparatus size and the currents coming into play, without affecting, on the other hand, the excellent efficiency of both the machine (carriage) and the whole sorting system.

To solve this problem, the present invention provides a method for the controlled actuation of the belts that unload the items, consisting in actuating the motor a few seconds before the unloading, so as to collect in a flywheel the necessary power, and in inserting a joint, at the proper moment, between the motor and the belt.

Said joint, of known type, will be preferably of the kind that can be controlled in function of the instantaneous speed of the belt.

Figure 2:
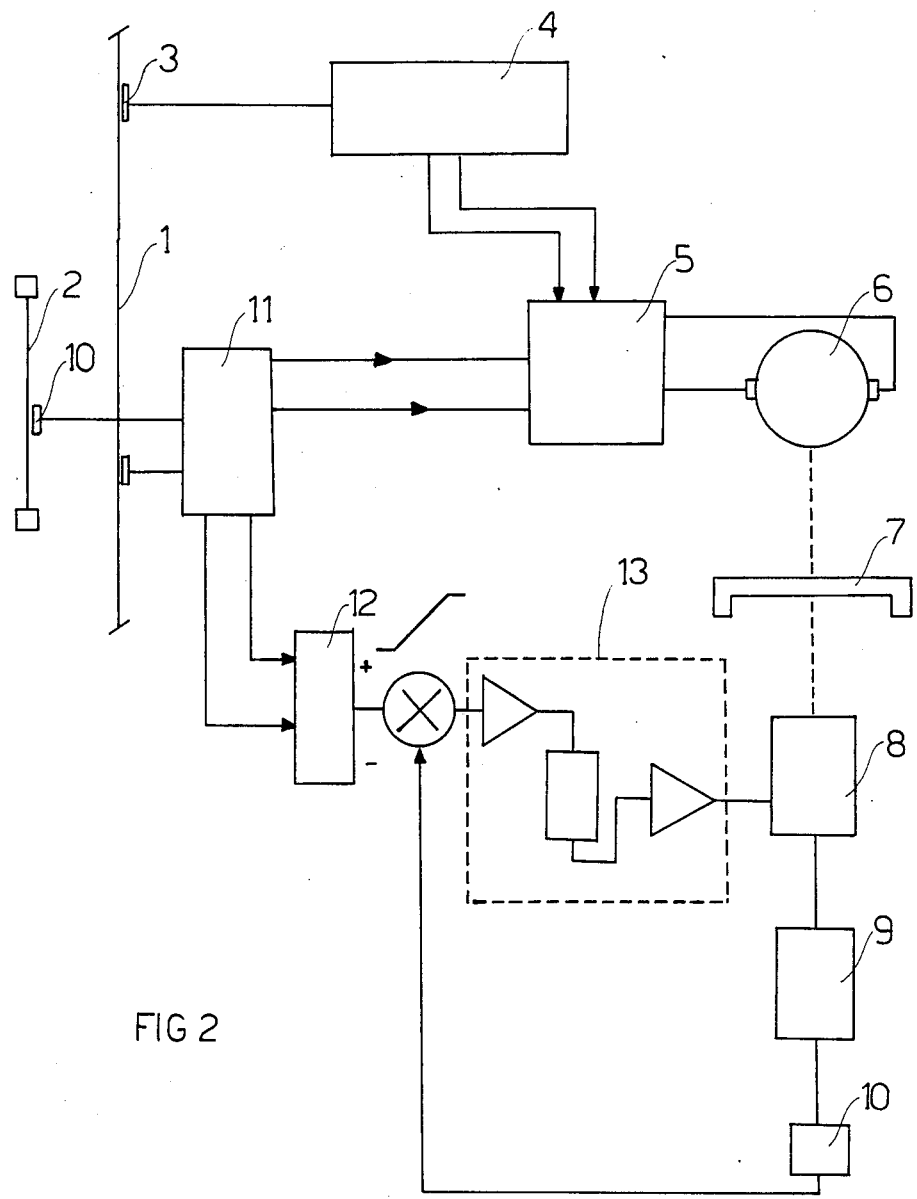

The present invention will be now described in detail, by mere way of non limiting example, with special reference to the enclosed FIG. 2, that shows the block diagram of the devices for the controlled actuation of the unloading belt according to invention method.

In the figure are indicated by No. 1 the continuous bus bars that provide the necessary power for actuating the motors, while by No. 2 are indentified the discontinuous bars that feed the control and the drive devices.

A plurality of sliding contacts, indicated as a whole by No. 3, link the bus bars 1 to a feeder 4 connected in turn with a static relay unit 5.

The power is supplied through the above described elements, to a motor 6, preferably of the d.c. type, the shaft of which is connected with a flywheel 7 and a joint 8.

The joint may be of any kind, for instance of the magnetic powder or of the parasitic current type.

The preferred kind of joint, however, is the one that can be acted upon to control, instant by instant, the torque it transmits: e.g. a parasitic current joint.

Said joint is secured to the movable part unit, comprising the supporting rollers of the revolving belt, the belt and the conveyed item, parts that are identified by No. 9.

To the discontinuous bus bars 2 is secured instead, through sliding contacts 10, an interface device 11 linked at one side to the imputs of the static relays 5, and at the other side to a ramp generator 12. Instead of by sliding contacts, the drive commands of device 11 can be sent by other known means, such as the inductive coupling or the transmission of radio or optical signals.

The output of the ramp generator is connected with an amplifier circuit and frequency compensator that is connected with joint 8.

To the devices that carry out the unloading of the item is also linked a transducer, that may be for example a tachometric dynamo joined to the shaft of one of the rollers on which the belt is mounted; said dynamo sends off a the output a feedback signal that is sent to the amplifier circuit, the latter being identified as a whole by No. 13.

The method according to the invention provides the actuation of motor 6 some seconds before unloading, so as to store up in flywheel 7 a sufficient power to give the movable parts the necessary starting power for effecting the unloading in the predetermined times, and for subsequently actuating joint 8 so as to convey the accumulated energy to the load.

The working takes place as follows: each item to be sorted is placed on a belt and the central computer is contemporarily informed, e.g. by keyboard coding or other known system, of the final destination of the item.

The carriages move forward along the track as contacts 3 are constantly in contact with bus bars 1.

As each carriage approaches the area designated for unloading, the central computer sends tension to the corresponding discontinuous bar portion 2 and sends to the stati relays 5, through interface 11, the signal that makes the current coming from feeder 4 feed motor 6 and make it rotate in either direction, according to the side at which the item will be unloaded.

As the carriage advances towards the unloading are, flywheel 7, actuated by motor 6, accumulates a greater and greater amount of energy.

At the moment set for the unloading, the computer sends to interface 11, through the corresponding portion of discontinue bars 2, the signal necessary to actuate the ramp generator 12.

The energy stored up by flywheel 7 is then transmitted, through joint 8, to devices 9 that carry out the unloading of the item.

During this last stage the tachometric dynamo 10 gives out, instant by instant, a signal proportional to the unloading speed of the item. Said signal is sent to circuit 13 where it is compared to the reference signal produced by ramp generator 12; depending upon the resulting differences, the devices—of known type—present in circuit 13 act upon joint 8 so as to vary the torque produced by the same and to adjust thus the unloading speed of the time.

The described solution allows to obtain the remarkable advantages previously described. In fact, by extending the actuation of motor 6 by some seconds, and by storing the produced energy by flywheel 7, it is possible to employ less powerful and therefore smaller motors; above all, the powers into play can be dramatically limited, and it is no more necessary to oversize the feed devices. Furthermore, the possibility of using continue bus bars to send current to motor 6, as well as the possibility of using multiple sliding contacts, allows to avoid any sparkling phenomena.

An expert in the field may provide for several modifications and variations, which should all fall, however within the ambit of the present invention.

I claim:

1. A method for the controlled actuation of an unloading device in a sorting apparatus, the unloading device having a plurality of revolving belts for the conveyance and unloading of items thereon for sorting, comprising:

actuating a motor for an unloading device for conveying items in the portion of a conveyance path of the unloading device preceding an unloading zone therefor so as to accumulate energy in a flywheel before unloading takes place;

actuating subsequently a joint for connecting the flywheel with the unloading device and transferring the energy to the unloading device when passing the unloading zone for unloading the items conveyed thereby;

detecting the instantaneous conveyance speed of the unloading device along the conveyance path; and acting upon the joint in order to adjust the transfer of the energy to the unloading device to obtain an unloading speed thereof desired from the detected conveyance speed.

2. Devices to perform the unloading of the items conveyed in a sorting apparatus of the kind comprising a plurality of carriages dragged along a fixed path and provided each with a revolving belt capable of effecting the unloading of the conveyed item, characterized by providing, mounted on each carriage:

a motor connected with a flywheel and fed, through sliding contacts, by continuous bus bars located along the path;

a joint, that can be coupled in a continuous way located between said flywheel and said unloading means;

means suitable to actuate said motor and said joint at different times, in response to distinct signals sent either through discontinue bars placed along the path or through inductive coupling means or radio optical transmission means;

means suitable to detect the speed of said unloading means, and to provide a signal proportional to said speed;

means suitable to produce a reference signal and to compare said signal to said signal coming from said detecting means in order to act upon said joint by modifying the torque transmitted in function of the difference between said two signals.

* * * * *